US007911650B2

(12) United States Patent
Jahana et al.

(10) Patent No.: US 7,911,650 B2
(45) Date of Patent: Mar. 22, 2011

(54) INKJET PRINTING APPARATUS, IMAGE PROCESSING METHOD AND IMAGE PROCESSING APPARATUS

(75) Inventors: Ryoki Jahana, Kawasaki (JP); Yoshitomo Marumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 12/135,547

(22) Filed: Jun. 9, 2008

(65) Prior Publication Data

US 2009/0015849 A1 Jan. 15, 2009

Related U.S. Application Data

(63) Continuation of application No. PCT/JP2007/073850, filed on Dec. 11, 2007.

(30) Foreign Application Priority Data

Dec. 11, 2006 (JP) ................................ 2006-333201

(51) Int. Cl.
*H04N 1/40* (2006.01)

(52) U.S. Cl. ........................................ 358/2.1; 358/504

(58) Field of Classification Search .................. 358/1.9, 358/2.1, 500, 502, 504, 518
See application file for complete search history.

(56) References Cited

U.S. PATENT DOCUMENTS

2005/0018222 A1 1/2005 Yoshida

FOREIGN PATENT DOCUMENTS

| | | | |
|---|---|---|---|
| JP | 05-057965 | | 3/1993 |
| JP | 2003-320654 | A | 11/2003 |
| JP | 2004-358690 | A | 12/2004 |
| JP | 2006-231735 | A | 9/2006 |

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

Development of uneven gloss is reduced when printing mutually adjacent printing regions with pigment ink while overlapping boundary regions each other. A joint section and a non-joint section employ mutually different image processing such that a larger amount of ink having a relatively higher gloss level is used in the joint section as compared to the non-joint section. In this way, it is possible to uniform gloss impression between the non-joint section and the joint section and thereby to reduce uneven gloss.

7 Claims, 11 Drawing Sheets

INKJET PRINTING APPARATUS, IMAGE PROCESSING METHOD AND IMAGE PROCESSING APPARATUS

This application is a continuation of Application No. PCT/JP2007/073850, filed Dec. 11, 2007, the entire disclosure of which is incorporated herein by reference.

BACKGROUND OF THE INVENTION

1. Field of the Invention

The present invention relates to an inkjet printing apparatus, an image processing method, and an image processing apparatus. More specifically, the present invention relates to a technique to reduce an adverse effect to an image caused in overlapping (joint printing) boundary portions of mutually adjacent printing regions.

2. Description of the Related Art

The joint printing in inkjet printing is performed for the following purpose.

For example, a line printer employing a line-type inkjet head in which arrayed are numerous ink ejection openings in an orthogonal direction to a direction of printing medium conveyance can speed up the image formation. However, it is difficult to manufacture such a line-type inkjet head as provided with the ink ejection openings, fluid channels communicating therewith, and elements for generating energy to be used for ejection (such constituents will be hereinafter collectively referred to as nozzles when appropriate) over a broad range such as an entire width of a printing medium, with no defects. Accordingly, a head formed by arraying multiple short-sized head chips, which are relatively easy to manufacture and inexpensive, so as to extend the total length to satisfy a desired dimension is used for the line-shaped inkjet head.

However, in this configuration, an image defect called a "white stripe" is apt to occur along a sub-scanning direction in a joint section between the head chips which are used for printing mutually adjacent printing regions. This aspect occurs due to a so-called "end-deviation". The end-deviation is a phenomenon that a direction of ink ejection from ejection openings located on an end of the head chip is deflected inside an array of ejection openings in the head chip by an influence of airflow generated between the head chip and a printing medium in the case of printing an image requiring a heavy printing duty at a high speed. For this reason, no matter how accurately the head chips are arranged or even when end portions of the head chips overlap one another and the facing edges of the used areas of the ink ejection openings of these two head chips are aligned in the overlapping sections, white stripes may still occur at boundary sections between adjacent printing regions corresponding to the overlapping sections of the head chips. In addition, a stripe-shaped image defect may also occur at the boundary sections between adjacent printing regions in the case where the head chips have different amounts of ejection or where the head chips have different ink ejection speeds which causes a phenomenon that the ejected ink arrives at a printing medium with different timing, both of which are attributable to piece-to-piece manufacturing variations of the head chips.

Accordingly, as disclosed in Japanese Patent Laid-Open No. 5-57965 (1993), for example, it is possible to reduce stripe-shaped image defects by disposing head chips so as to allow end portions overlap one another in the sub-scanning direction and appropriately determining printing densities of the head chips corresponding to joint sections.

Moreover, the above-mentioned stripe-shaped defects also occur in so-called serial printers configured to perform printing by alternately repeating main scanning in a direction different from a direction of an array of ink ejection openings in a printing head formed by arraying the ink ejection openings and conveyance (sub-scanning) of a printing medium. Specifically, when a width of a printing region (a band) in one session of main scanning is narrowed by the "end-deviation" or when the sub-scanning amount is excessive, a section where printing is not executed is left at a band boundary section along the main scanning direction. Therefore, it is effective to overlap band edges each other by setting sub-scanning amount at shorter than a length of an array of the ink ejection openings.

Development of a large white stripe is reduced by applying the technique disclosed in Japanese Patent Laid-Open No. 5-57965 (1993), for example. However, the inventors of the present invention have found out that a joint section has a lower gloss level than a non-joint section and an adverse effect to an image is caused as a consequence. Specifically, a section having a lower gloss level emerges as a stripe extending in the sub-scanning direction in the case of a line printer or as a stripe extending in the main scanning direction in the case of a serial printer, which is observed as uneven gloss. Moreover, the inventors have found out that the uneven gloss is observed more remarkably in the case of printing on a printing medium such as gloss paper by use of pigment ink. Normally, gloss paper is selected when a user desires high-quality printing. Thus the fact that such an adverse effect to an image is caused on gloss paper does not appropriate to the needs of the user and therefore make it meaningless to use quality paper. Accordingly, this is a serious problem.

SUMMARY OF THE INVENTION

It is therefore an object of the present invention to reduce development of uneven gloss in the case of printing adjacent printing regions by overlapping boundary regions to one another.

In a first aspect of the present invention, there is provided an inkjet printing apparatus configured to perform printing by use of an inkjet head having first ejection-opening arrays each having ejection openings for ejecting first ink arranged in a predetermined direction and second ejection-opening arrays each having ejection openings for ejecting second ink arranged in the predetermined direction, the second ink having a similar color to the first ink and exhibiting a higher gloss level on a printing medium than that is exhibited by the first ink on the printing medium, the first ejection-opening arrays being arranged so as to have an overlapping section in a direction crossing the predetermined direction and the second ejection-opening arrays being arranged so as to have an overlapping section in the direction crossing the predetermined direction, the inkjet printing apparatus comprising:

a determination unit that determines amounts of the first ink and the second ink used to print on a joint section to be printed by the ejection openings included in the overlapping portions, and determines amounts of the first ink and the second ink used to a non-joint section to be printed by the ejection openings excluded from the overlapping portions, wherein the determination unit determines usage amounts of the first ink and the second ink for the respective joint and non-joint sections such that the amount of the second ink used for expressing a predetermined density is more in a unit area of the joint section than in the unit area of the non-joint section, and the amount of the first ink used for expressing the predetermined density is less in the unit area of the joint section than in the unit area of the non-joint section.

In a second aspect of the present invention, there is provided an inkjet printing apparatus configured to perform printing by use of an inkjet head having a first ejection-opening array in which ejection openings for ejecting first ink are arranged in a predetermined direction and a second ejection-opening array in which ejection openings for ejecting second ink are arranged in the predetermined direction, the second ink having a similar color to the first ink and exhibiting a higher gloss level on a printing medium than that exhibited by the first ink on the printing medium, the inkjet printing apparatus comprising:

a moving unit that moves the inkjet head in a moving direction crossing the predetermined direction;

a conveying unit that conveys the printing medium in a conveying direction crossing to the moving direction so as to produce a joint section by overlapping ends of bands to be printed in the moving of the inkjet head; and a determination unit that determines amounts of the first ink and the second ink used to print on the joint section, and determines amounts of the first ink and the second ink used to print on a non-joint section other than the joint section, wherein the determination unit determines usage amounts of the first ink and the second ink for the respective joint and non-joint sections such that the amount of the second ink used for expressing a predetermined density is more in a unit area of the joint section than in the unit area of the non-joint section, and the amount of the first ink used for expressing the predetermined density is less in the unit area of the joint section than in the unit area of the non-joint section.

In a third aspect of the present invention, there is provided an image processing method of generating image data used for printing by use of an inkjet head having first ejection-opening arrays each having ejection openings for ejecting first ink arranged in a predetermined direction and second ejection-opening arrays each having ejection openings for ejecting second ink arranged in a predetermined direction, the second ink having a similar color to the first ink and exhibiting a higher gloss level on a printing medium than that is exhibited by the first ink on the printing medium, the first ejection-opening arrays being arranged so as to have an overlapping section in a direction crossing the predetermined direction and the second ejection-opening arrays being arranged so as to have an overlapping section in the direction crossing the predetermined direction, the image processing method comprising:

a step of generating image data for printing on a joint section to be printed by the ejection openings included in the overlapping portions, and image data for printing a non-joint section to be printed by the ejection openings excluded from the overlapping portions, wherein, in the generating step, image data for printing the respective joint and non-joint sections are generated such that the amount of the second ink used for expressing a predetermined density is more in a unit area of the joint section than in the unit area of the non-joint section, and the amount of the first ink used for expressing the predetermined density is less in the unit area of the joint section than in the unit area of the non-joint section.

In a fourth aspect of the present invention, there is provided an image processing method of generating image data used for printing by use of an inkjet head having a first ejection-opening array having ejection openings for ejecting first ink and a second ejection-opening array having ejection openings for ejecting second ink having a similar color to the first ink and exhibiting a higher gloss level on a printing medium than that exhibited by the first ink on the printing medium, the inkjet printing apparatus comprising:

a step of generating image data for printing a joint section at which ends of bands to be printed on the printing medium in moving of the inkjet head overlap each other, and image data for printing a non-joint section other than the joint section, wherein, in the generating step, image data for printing the respective joint and non-joint sections are generated such that the amount of the second ink used for expressing a predetermined density is more in a unit area of the joint section than in the unit area of the non-joint section, and the amount of the first ink used for expressing the predetermined density is less in the unit area of the joint section than in the unit area of the non-joint section.

In a fifth aspect of the present invention, there is provided an image processing apparatus comprising an image processing unit capable of performing the above image processing method.

In a sixth aspect of the present invention, there is provided a computer program for causing a computer to execute the above image processing method.

According to the present invention, a difference in gloss between non-joint sections and joint sections is minimized by employing different types of image processing to the joint sections and the non-joint sections and uneven gloss is thereby reduced.

Further features of the present invention will become apparent from the following description of exemplary embodiments (with reference to the attached drawings).

DESCRIPTION OF THE EMBODIMENTS

Now, the present invention will be described in detail with reference to the accompanying drawings.

First Embodiment

Figure 1:
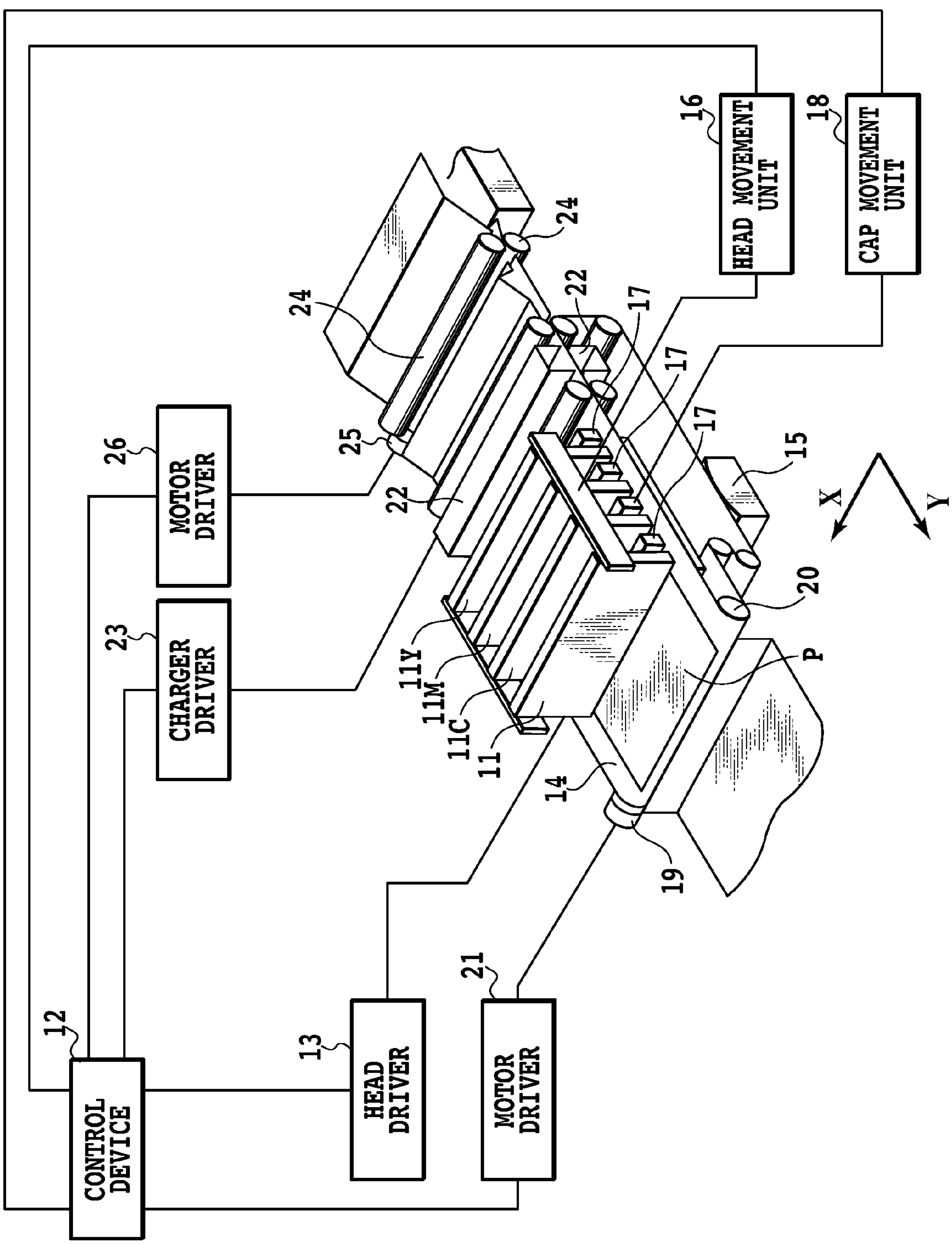
FIG. 1 is a schematic perspective view showing a configuration of an inkjet printing apparatus according to a first embodiment of the present invention.

FIG. 1 is a schematic perspective view showing a configuration of an inkjet printing apparatus according to a first embodiment of the present invention. Meanwhile, FIG. 2 is a schematic diagram of one of inkjet heads applied to the printing apparatus in FIG. 1, which is viewed from the side of ejection openings.

An inkjet printing apparatus of this embodiment employs long-sized inkjet heads 11, 11C, 11M, and 11Y extending in a direction X (a main scanning direction) which is crossing a conveyance direction (a sub-scanning direction) Y of a printing medium P. Here, the inkjet head 11 corresponds to black ink and to gray ink having a lower density than the black ink. Meanwhile, the inkjet heads 11C, 11M, and 11Y correspond to cyan, magenta, and yellow ink, respectively. In this way, the inkjet printing apparatus in FIG. 1 can perform full-color printing. Each of the inkjet heads receives ink supply from each of unillustrated ink tanks storing the corresponding color ink through connection pipe. Although an aspect of providing one inkjet head for each of the different colors is illustrated herein, the inkjet heads (hereinafter simply referred to as the "heads" when appropriate) for each of the different colors may be integrated.

Figure 2:
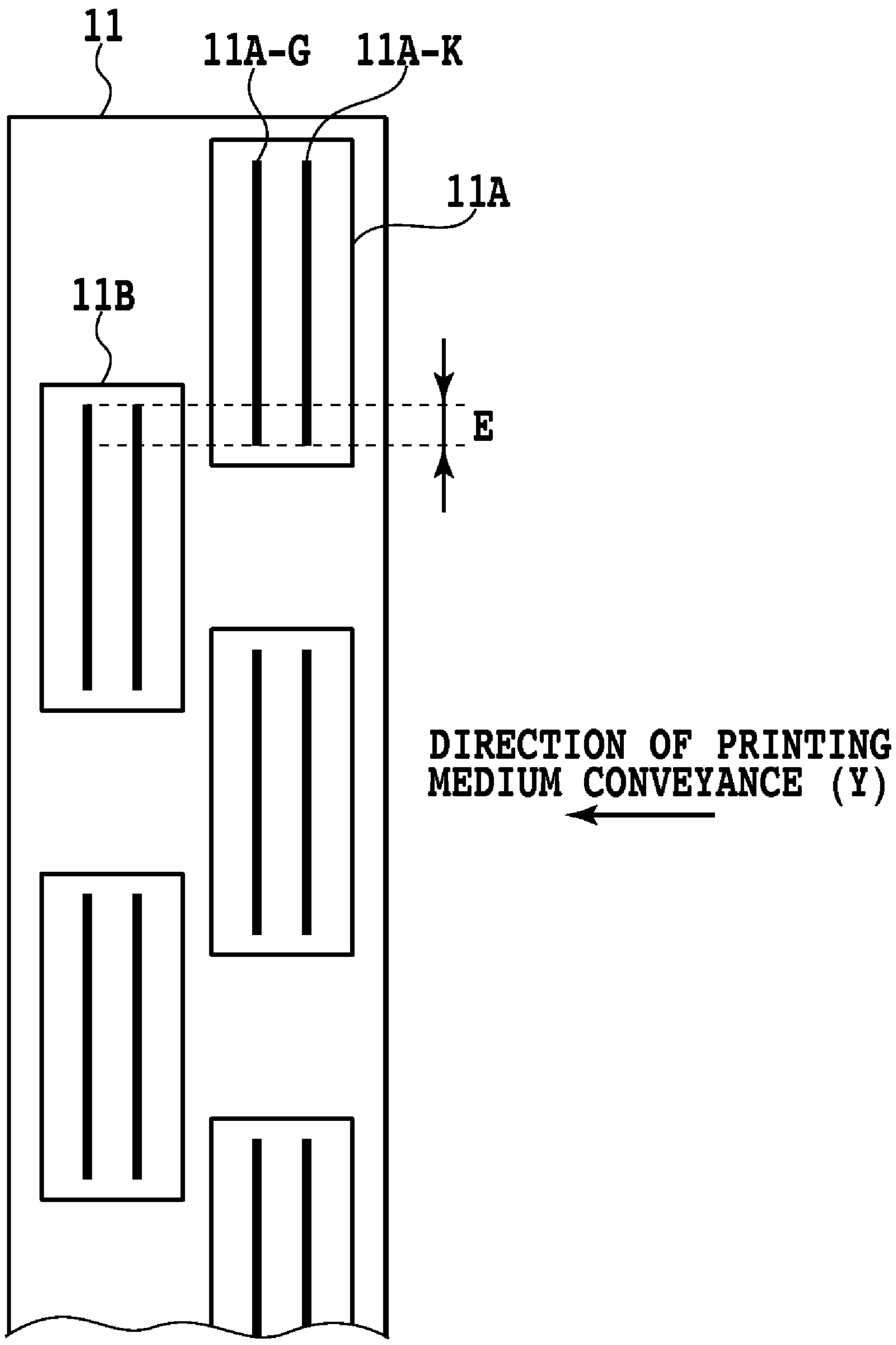
FIG. 2 is a schematic diagram of an inkjet head employed to the printing apparatus in FIG. 1, which is viewed from the side of ejection openings.

As shown in FIG. 2, the head 11 includes head chips 11A, 11B and so forth functioning as ejecting portions, each of which is provided with an ejection opening array 11-K for the black ink and an ejection opening array 11-G for the gray ink of the similar color to the black, and each of the ejection opening array has multiple ejection openings over a predetermined length in the main scanning direction. The head chips 11A, 11B and so forth are arranged zigzag on the plane defined by the main scanning direction X and the sub-scanning direction Y, and end portions (end regions E) of two head chips (such as the chip 11A and the chip 11B) that are involved in printing mutually adjacent regions overlap each other in the sub-scanning direction. Here, the ejection opening arrays 11-K and 11-G do not always have to be provided on the single inkjet head but may be provided on mutually different inkjet heads. The present invention is applicable to any of these aspects as long as the ejection opening arrays 11-K and 11-G are disposed so as to have overlapping sections in the direction (the direction Y) crossing the array direction (the direction X) of the ejection openings. Here, when two types of ink—one being of a higher density and the other being of a lower density—are used for any of the inkjet heads 11C, 11M, and 11Y, it is possible to employ a similar configuration and a similar layout for head chips which is provided with ejection opening arrays respectively for two density types of ink (dark ink and light ink).

The inkjet head is rendered movable in the vertical direction of FIG. 1 by use of a head movement unit 16, of which operation is controlled by a control device 12. Meanwhile, head caps 17 are disposed beside the respective inkjet heads 11. The head caps 17 is used for performing a recovery process to discharge, from the ejection openings, thickened ink present in ink liquid channels that communicate with each of the ejection openings, prior to an operation of printing onto the printing medium P. Specifically in the recovery process, the inkjet head is lifted up from an original position facing the printing medium. Thereafter, the caps 17 are allowed to move immediately below the inkjet heads by a cap movement unit 18 of which actions are controlled by the control device 12 so as to catch waste ink discharged from the ink ejection openings.

A conveyor belt 14 for conveying the printing medium P is wound around a driving roller connected to a belt driving motor 19, and actions thereof are switched by a motor driver 21 connected to the control device 12. Meanwhile, it is possible to provide a charger 22 at an upstream of the conveyor belt 14 as an additional configuration for allowing the printing medium P to adsorb to the conveyor belt 14 by means of charging the conveyor belt 14. Application of electricity to this charger 22 is turned on and off by use of a charger driver 23 connected to the control device 12. A pair of feeding rollers 24 for feeding the printing medium P onto the conveyor belt 14 is connected to a feeding motor 25 for driving and rotating the feeding rollers 24. Actions of this feeding motor 25 are switched by a motor driver 26 connected to the control device 12. Therefore, when performing an operation to print on the printing medium P, the charger 22 is activated and the conveyor belt 14 is driven at the same time, and then the printing medium P is placed on the conveyor belt 14 by use of the feeding rollers 24. Thereby the printing medium P is conveyed in the Y direction on the conveyor belt 14. During the conveyance, a color image is printed on the printing medium P by use of the inkjet heads 11, 11C, 11M, and 11Y. Here, reference numeral 13 denotes a head driver which is configured to control driving of elements for generating energy used for ink ejection (such as heat generating elements to generate film boiling of the ink).

Figure 3:
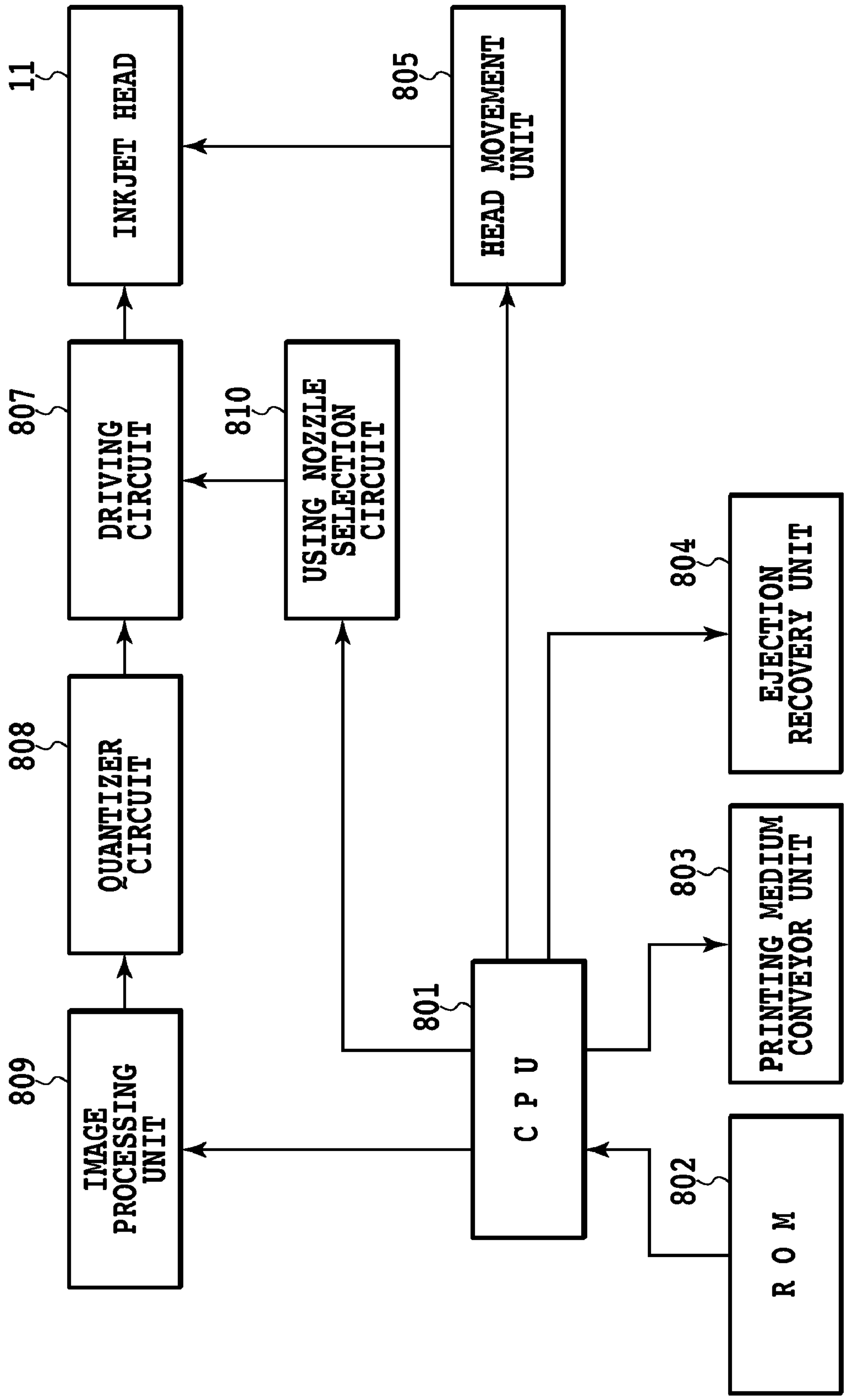
FIG. 3 is a block diagram showing a configuration example of principal parts of a control system of the inkjet printing apparatus according to the embodiment shown in FIG. 1.

FIG. 3 shows a configuration example of principal parts of a control system of the inkjet printing apparatus according to this embodiment. In the drawing, reference numeral 801 denotes a central processing unit (CPU) for controlling the entire system, which corresponds to the control device 12 in FIG. 12. Reference numeral 802 denotes a read-only memory (ROM) that stores system control programs to be executed by the CPU 801 as well as other fixed data. Reference numeral 803 denotes a conveyor unit for conveying a printing medium, which includes the belt driving motor 19, the motor driver 21, the feeding motor 25, the motor driver 26, and the like. Reference numeral 804 denotes an ejection recovery unit for performing the head recovery process, which includes the head caps 17 and the cap movement unit 18. Reference numeral 805 denotes a head movement unit which includes a carrier and the head movement unit 16 for loading the inkjet head and achieving necessary movement thereof.

Reference numeral 807 denotes a driving circuit for controlling the driving of the heat generating elements in the inkjet head, which corresponds to the head driver 22. Reference numeral 808 denotes a quantizer circuit for converting multivalued image data obtained through the color separation processing by an image processing unit into binary image data (ejection data), which is configured to perform halftoning processing such as dither processing or error diffusion processing. Reference numeral 809 denotes the image processing unit configured to separate multivalued image data to be printed (data supplied from an unillustrated host device such as a computer, for example) in different colors corresponding to the ink colors used in the printing apparatus to generate multivalued image data corresponding to each of the ink colors. In particular, this image processing unit 809 performs different types of image data generation processing for the end regions E corresponding to the joint sections and for regions corresponding to the non-joint sections other than the joint sections in terms of the black ink ejection opening array 11-K and the gray ink ejection opening array 11-G (to be described later).

Reference numeral 810 denotes a circuit for selecting the nozzles used for an ejecting action in accordance with the head chips and the inkjet head. This using nozzle selection circuit 810 carries out functions to appropriately determine the using nozzles out of the group of nozzles provided on each of the head chips and to transfer the necessary print data for the using nozzles to the driving circuit 807. To be more precise, it is possible to perform appropriate masking of the groups of nozzles located in the head chip end regions E corresponding to the joint sections.

Figure 4:
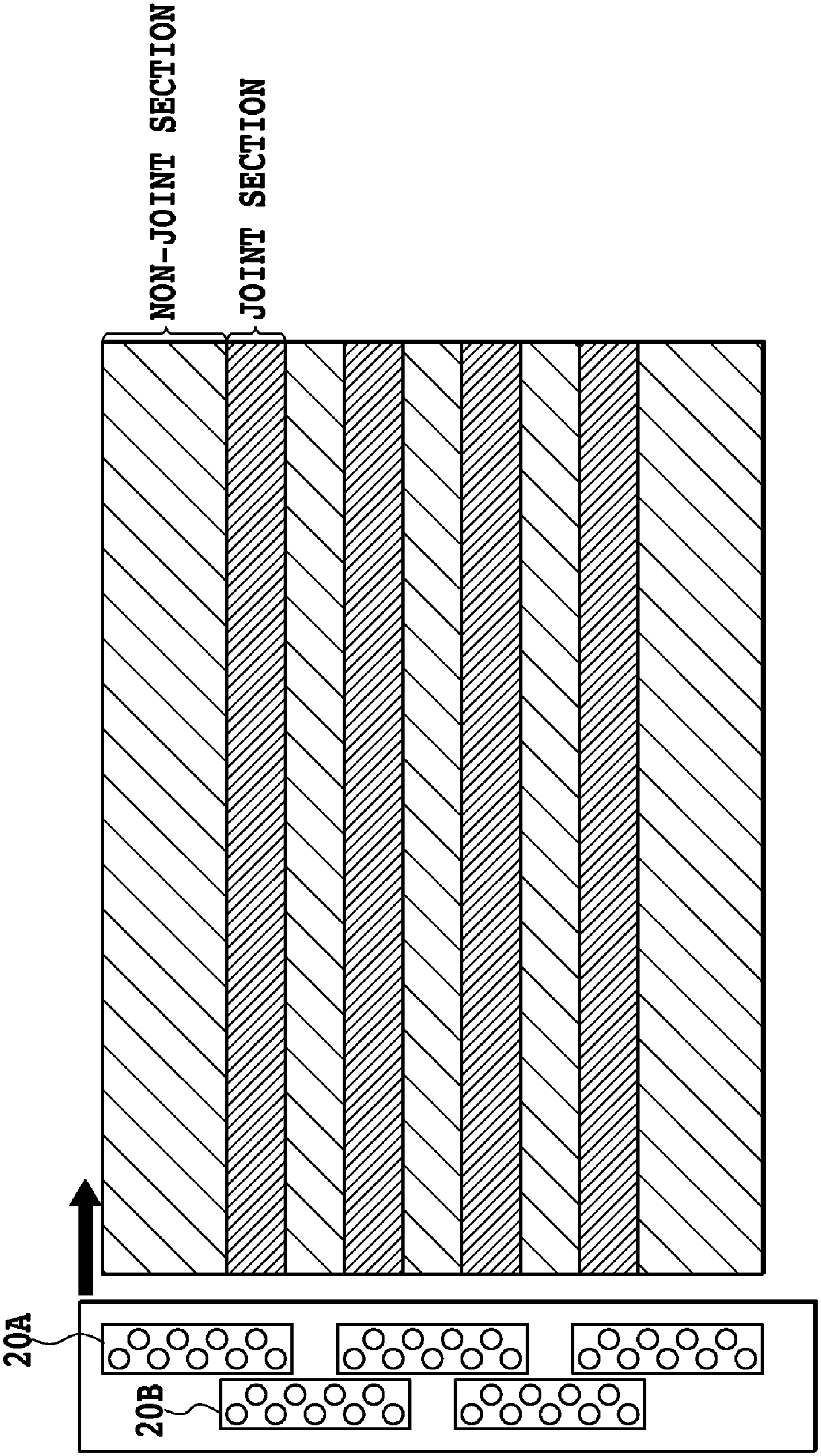
FIG. 4 is a conceptual diagram for explaining aspects of printing joint sections and non-joint sections.

Aspects of printing the joint sections and the non-joint sections will now be described with reference to FIG. 4. Note that the drawing illustrates the array of the ejection openings for one color of ink for simplification. Moreover, the number of the ejection openings is also simplified in the drawing.

On the joint sections printing are performed by use of the end regions where two ejection opening arrays 20A and 20B overlap each other in the sub-scanning direction. In this case, according to the technique disclosed in Japanese Patent Laid-Open No. 5-57965 (1993), a process to join the printing regions while providing the joint sections with a hue (gradation) is conducted (such processing will be hereinafter referred to as a gradation joining process). That is, the joint sections are formed by gradually changing ink application rates in the end regions of the two ejection opening arrays so as to complement each other. The ink application rate is an operation allowing rate of a certain nozzle or continuous multiple nozzles for performing ejecting actions (working), and the complement of each of the rates is equal to its thinning-out rate on an image data. These factors can be set by means of masking conducted by the using nozzle selection circuit 810.

Then, processes for reducing the ink application rate gradually and linearly toward the endmost portion of the end region of the ejection opening array 20A while increasing the ink application rate gradually and linearly from the endmost portion of the end region of the ejection opening array 20B are executed, for example. Accordingly, it is possible to obtain a total ink application rate equal to 100% at the joint section by such a complementarity. Alternatively the factors can be set to obtain a total ink application rate over 100% in either the entire or part of each of the joint section.

This gradation joining process has been deemed to be effective for alleviating an image defect at the joint sections attributable to the above-described end-deviation, piece-to-piece manufacturing variations of the head chips, mechanical variation or the like. However, the inventors have found out that uneven gloss still appears when printing using pigment ink is performed with employing only the gradation joining process as to alleviate image defects. And this phenomenon is especially obvious when such printing is performed on a printing medium such as gloss paper.

In this context, the inventors have considered as follows. Specifically, two printing sessions are executed onto each of the joint sections by the end regions E of the head chip in the gradation joining process. When using the pigment ink, a large amount of a color material remains on a surface of the printing medium. Moreover, at least some of dots formed afterwards overlap on previously formed dots and are fixed as they are arranged. Therefore, when the joint sections are printed by use of the end regions of head chip where the ink application rates of each pair of the end regions are defined so as to complement each other, a difference in a level from the non-joint sections where the ink application rate is set to 100% in the first place is caused. The inventors have considered that this difference would be observed as a difference in gloss between the joint sections and the non-joint sections.

Accordingly, the inventors have executed the following verification.

Concerning the joint section, the printing medium passes through a position facing the end region of the head chip twice. This aspect is equivalent to printing by multiple passes. Accordingly, the inventors have conducted an experiment to find out relations between the number of passes and the gloss level in multipass printing executed by a serial inkjet printing apparatus. Here, the multipass printing is a printing method to complete an image by executing main scanning for N times in the same image region. In this method, multiple nozzles arrayed on a printing head of the printing apparatus are divided into N blocks, and sub-scanning size to be executed corresponds to a width which can be printed with a group of nozzles in each block. Here, the sub-scanning size is smaller than a range where the nozzles are arranged.

In the experiment, some patches having different densities (area factors) are printed on gloss paper in a multiple number of passes by use of pigment ink, and the gloss level of each of the patches is measured. Detailed experimental conditions are as follows:

Ink: Pigment ink "Pg Ink (product code: BCI1451)" manufactured by Canon, Inc.

Printing medium: Gloss paper "IJ-RC-UF120" manufactured by Mitsubishi Paper Mills Ltd Patches: Patches 1 to 6 formed by changing the area factors from 20% to 200% stepwise (the area factors of Patches 1, 2, 3, 4, 5 and 6 are 20%, 56%, 92%, 128%, 164% and 200%, respectively.)

Number of printing passes: Two types (1 pass and 8 passes)

Gloss measuring instrument: Micro-haze meter manufactured by BYK Gardner, Inc

Figure 5:
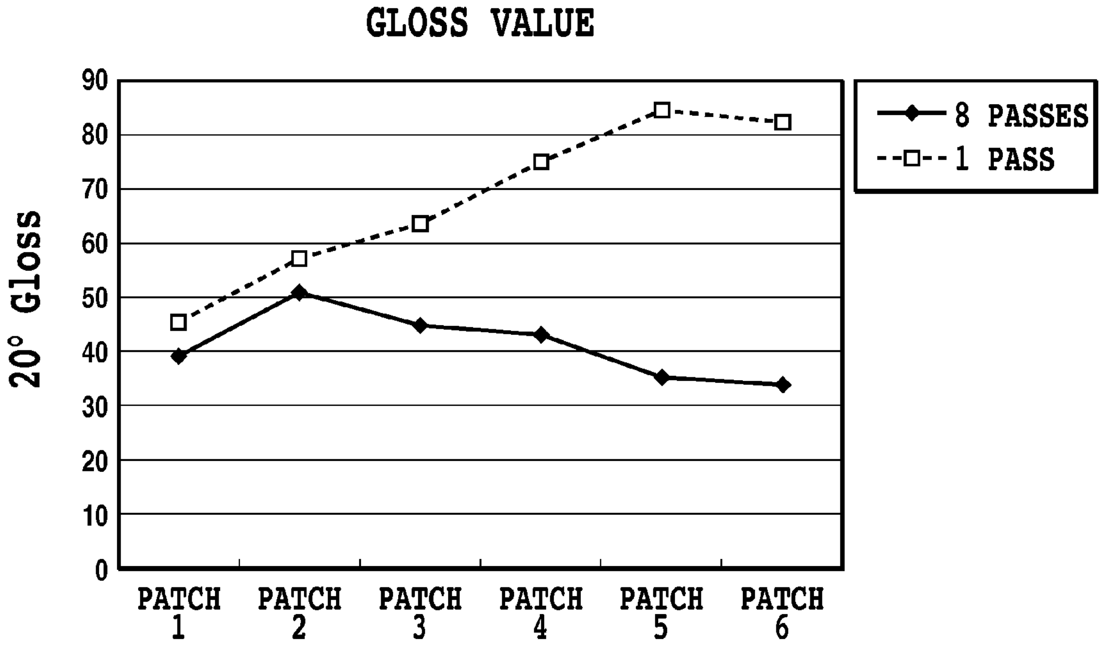
FIG. 5 is a graph showing an experimental result of measuring relations between the number of printing passes and variation of gloss values.
Figure 6:
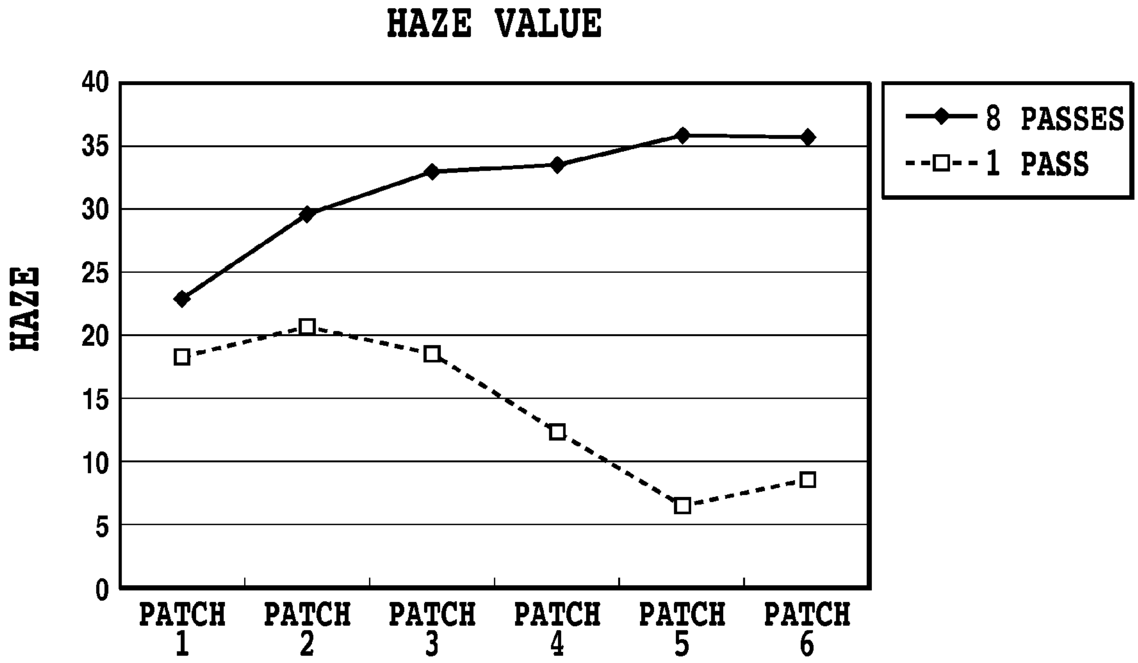
FIG. 6 is a graph showing an experimental result of measuring relations between the number of printing passes and variation of haze values.

FIG. 5 and FIG. 6 are graphs showing experimental results of measuring gloss of the patches for each of the two numbers of printing pass(es). The longitudinal axis in FIG. 5 indicates gloss value, which represents a gloss level of specular reflection components after irradiation of light onto the patches at a constant angle (20° in the experiment). Specifically, this gloss level is obtained by measuring an amount of reflection in a direction of a reflection angle equal to the incident angle. Meanwhile, the longitudinal axis in FIG. 6 indicates haze value which represents so-called "blur", a gloss level measured in a direction shifted by a certain angle (1.8° in the experiment) from the specular reflection angle.

As apparent from these graphs, images printed in one pass generally turned out to have higher gloss value and lower haze value than images printed in eight passes over various regions of densities, or in other words, the image printed in one pass turned out to have higher gloss levels. That is, it was confirmed that gloss impression of the printed image is reduced as the number of paths is increased. Moreover, the inventors have repeated similar experiments by using various types of pigment ink and gloss paper. In each case, similar tendencies to FIG. 5 and FIG. 6 were confirmed.

As described above, the fact that the gloss impression varies according to the number of passes to form printed images means nothing else but a fact that the joint section where printing is executed by use of the end regions of two head chips has lower gloss than the non-joint section. In other words, since the joint section and the non-joint section have different levels of gloss, and the uneven gloss therefore becomes conspicuous.

To reduce the difference in gloss between the joint sections and the non-joint sections, the present invention is configured to perform mutually different color separation processing (image data generation processing) on the joint section and the non-joint section, to thereby effectively reduce uneven gloss. To be more precise, first ink and second ink of a similar color to the first ink but exhibiting a higher gloss level are prepared. For example, a dark ink (black ink) with higher density as the first ink and a light ink (gray ink) with lower density as the second ink are prepared. Then, the image data corresponding to the "joint sections" and the image data corresponding to the "non-joint sections" are generated such that usage amount per unit area (e.g. per pixel) of the second ink in the "joint sections" becomes greater than usage amount thereof in the "non-joint sections", when a predetermined density range are expressed. In this way, it is possible to reduce the difference between the gloss level of the "non-joint section" which tends to be relatively higher and the gloss level of the "joint section" which tends to be relatively lower. For the first ink, two pieces of image data respectively corresponding to the "joint sections" and the "non-joint sections" are also generated. However, on the contrary to the second ink, the usage amount of the first ink for expressing the predetermined density range is smaller in the "joint sections" than in the "non-joint sections". The image data thus generated for the first and second ink makes it possible to reduce the difference in gloss while maintaining the density intended to be expressed.

The above-described image data generation processing (the color separation processing) is executed by the image processing unit 809. Note that this color separation processing is performed to determine the usage amounts of the first ink and second ink. Accordingly, in executing this color separation processing, the image processing unit 809 functions as an ink usage amount determination unit.

The image processing unit 809 converts RGB data with 8-bit (0 to 255) per pixel into color separation data by using a color conversion (color separation) table. This color separation data are data to define the usage of the ink in each color used in the printing apparatus for reproducing the color information expressed by the RGB data. To be more precise, the color separation table dedicated to the joint sections and the color separation table dedicated to the non-joint sections are prepared as the color separation tables (see FIG. 7). By using these different color separation tables, two color separation data for the "joint section" and the "non-joint section" are generated, respectively. These different color separation tables make it possible to use the first ink and second ink in the joint sections different in amounts from those in the non-joint sections. Characteristics of the color separation tables dedicated respectively to the "joint sections" and the "non-joint sections" will be described later in detail with reference to FIG. 7. Incidentally, final printing density (gradation) characteristics to be obtained on the printing medium contain all characteristics of the used inkjet head, the used printing medium, the used ink, the used quantization process, and so forth. Therefore, the final printing density does not vary linearly with the inputted RGB values ranging from 0 to 255. Instead, the final printing density varies non-linearly with the inputted values and halftone sections tend to be printed with higher density than the inputted values in many cases. Therefore, the process by the image processing unit 809 may include a process (such as a γ correction process) to make the printing density values eventually vary linearly with the inputted values by means of applying inverse characteristics which are obtained by measuring the gradation characteristics of the ink in each color used in the printing apparatus before the quantization process.

This embodiment employs the configuration to use the black (K) ink as the first ink and the gray (G) ink as the second ink. In other words, this embodiment employs the configuration to use two density types of achromatic color ink for a density reproduction range from white (R=G=B=0) to black (R=G=B=255).

Here, the RGB values represent density values instead of luminance values for convenience of explanation.

Further, in this embodiment, the non-joint sections and the joint sections employ mutually different color separation tables (see FIG. 7) in order to suppress occurrence of uneven gloss by reducing the difference in the gloss between the non-joint sections and the joint sections.

Figure 7:
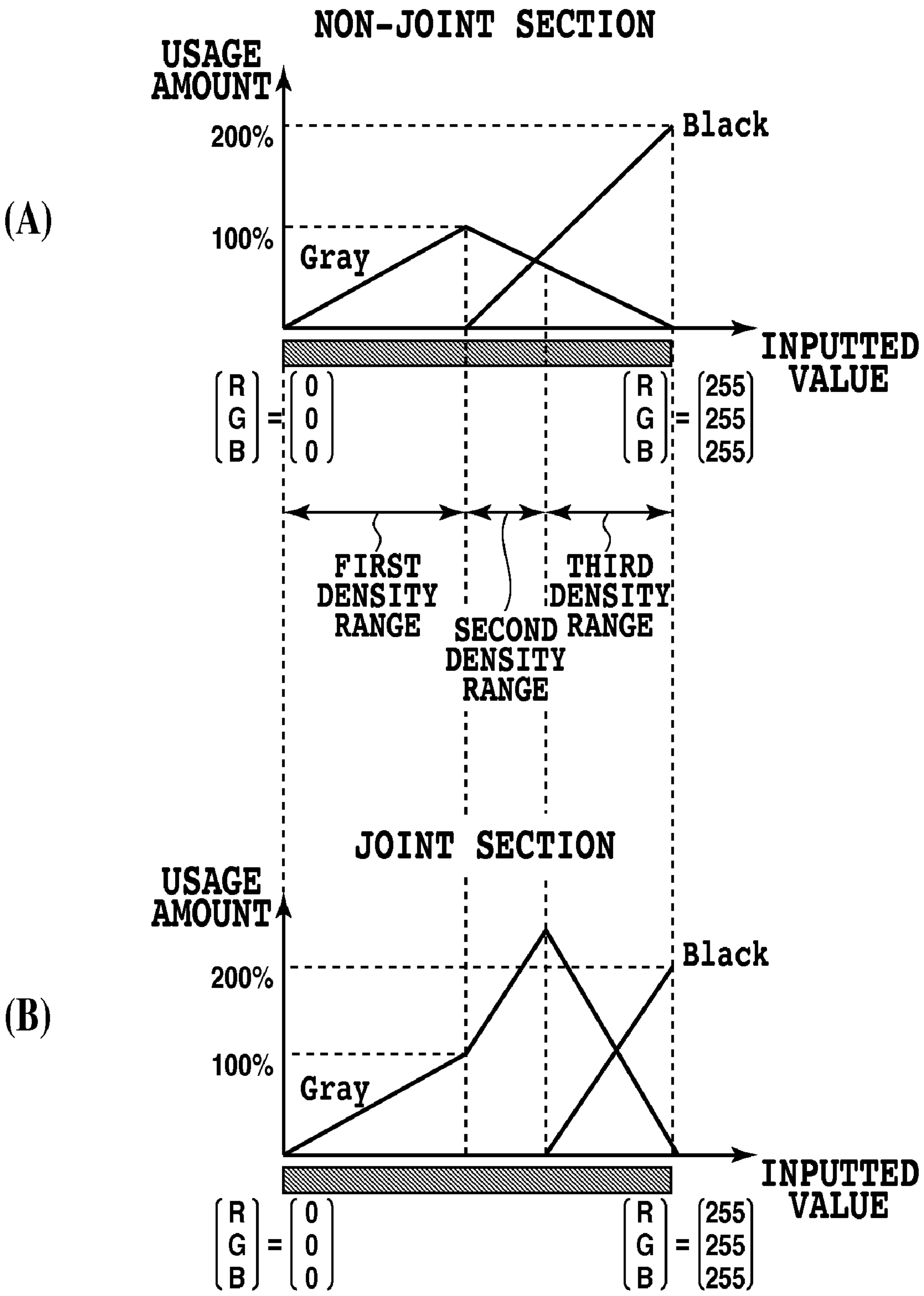
FIG. 7 is an explanatory views showing color separation tables to be respectively applied to the non-joint sections and the joint sections.

In FIGS. 7 (A) and (B) show examples of the color separation tables to be respectively applied to the non-joint sections and the joint sections by the image processing unit 809. In FIGS. 7 (A) and (B) show the usage amounts of the gray ink (the second ink) and the black ink (the first ink) for expressing a gray line represented by the inputted RGB values each including R, G and B values equal to each other. The abscissa axis indicates the RGB values representing the gray line ranging from while (R=G=B=0) to black (R=G=B=255). Here, since the RGB values represent density values instead of luminance values for convenience of explanation, the lowest density is defined as R=G=B=0 while the highest density is defined as R=G=B=255. Meanwhile, the longitudinal axis indicates the usage amounts of the gray ink and the black ink. Each usage amount is expressed as an ink application rate relative to printing resolution. Here, when printing resolution is assumed to be equal to X dpi (dots per inch), the usage amount of 100% means applying one dot in a 1/X-inch square area, and the usage amount of 200% means applying two dots in the 1/X-inch square area. In FIG. 7, (A) shows the color separation table for the non-joint sections and, (B) shows the color separation table for the joint sections. In a first density range corresponding to a low density region, gradation is expressed by gradually increasing the usage amount of the gray ink with low-density in each of (A) and (B) in FIG. 7. Moreover, in the first density range, a usage amount of the gray ink for a certain inputted value is the same between the non-joint sections and the joint sections. Secondly, in a second density range that is higher than the first density range, the types and amounts of the ink used in the non-joint sections (FIG. 7, (A)) differ from those in the joint sections (FIG. 7, (B)). To be more precise, in the non-joint sections, gradation is expressed by using both of the black ink having relatively low gloss and the gray ink having relatively high gloss. Meanwhile, in the joint sections, gradation is expressed by using only the gray ink having relatively high gloss. Since no black ink is used in the joint sections (FIG. 7, (B)) as described above, the usage amount of the gray ink for expressing a certain density is larger in the joint sections than in the non-joint sections. Lastly, in a third density range that is higher than the second density range, the usage amount of the gray ink is gradually decreased while the usage amount of the black ink is gradually increased along with the increase in the inputted values in each of (A) and (B) in FIG. 7. At the maximum inputted value (R=G=B=255), the usage amount of the black ink becomes equal again between the two tables (with only the black ink used in amount of 200%). At all the remaining inputted values in the third density range, the usage amount of the black ink is always smaller in the joint sections than in the non-joint sections. Accordingly, the usage amount of the gray ink for expressing a certain density is always larger in the joint sections than in the non-joint sections, in this third density region as well.

As described above, the usage amounts of the gray ink and the black ink for reproducing a certain density (a density within the second and third density ranges) are adjusted such that the gray ink is used more in the joint sections than in the non-joint sections, and that the black ink is used less in the joint sections than in the non-joint sections. This adjustment makes it possible to reduce the difference in gloss while maintaining the density intended to be expressed.

Figure 8:
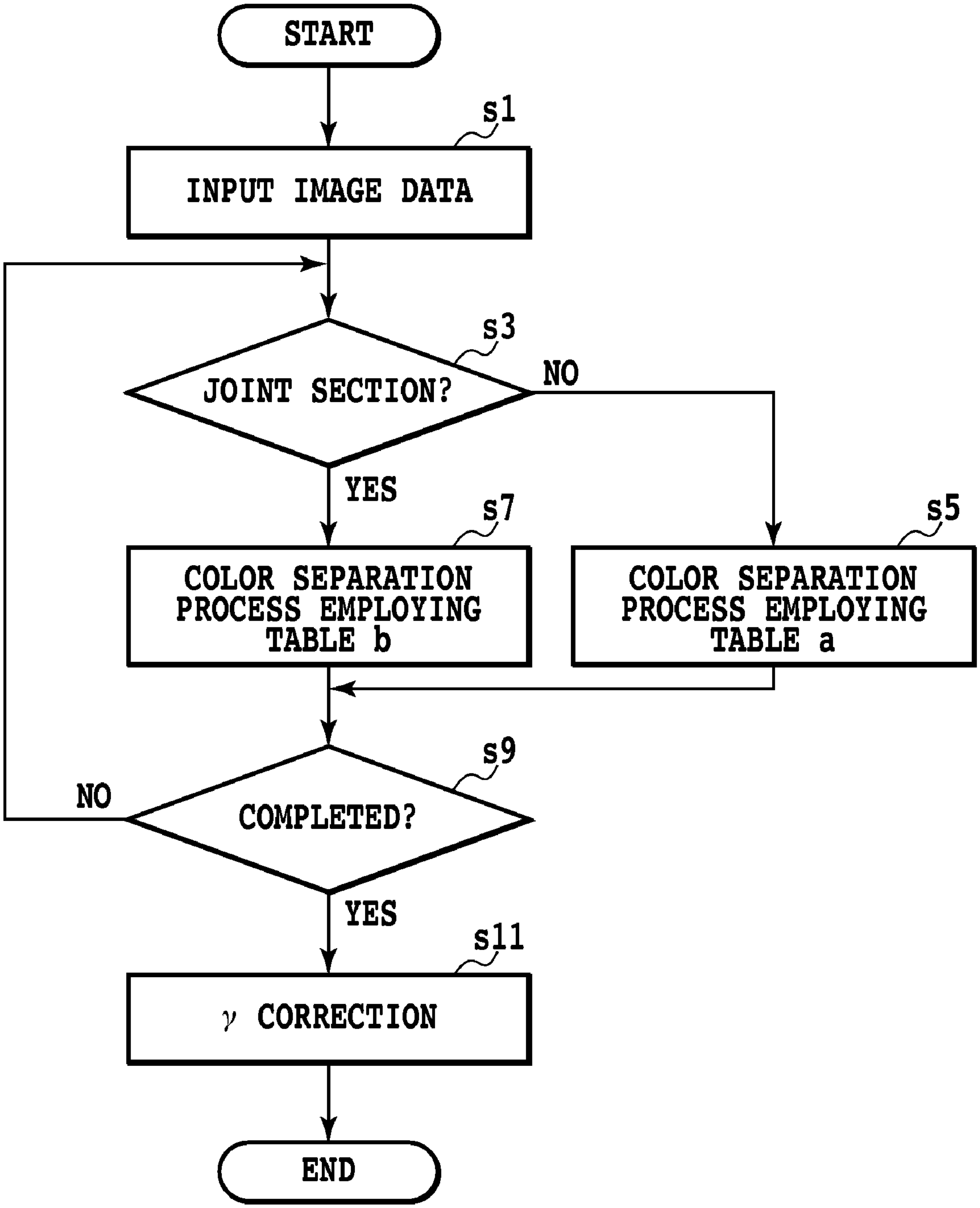
FIG. 8 is a flowchart showing an example of procedures of image processing in the first embodiment.

FIG. 8 shows an example of procedures to be executed by the image processing unit 809 according to whether each portion corresponds to the non-joint section or the joint section.

When the image data are inputted (Step s1), a judgment is made for each portion of the image data as to whether or not the portion is included in the joint section (Step s3). Here, which portion constitutes the non-joint section or the joint section can be judged according to the above-described layouts of the head chips. Moreover, in response to the judgment, the color separation process is executed by making reference to the table shown in (A) in FIG. 7 (a table a) for the image data contained in the non-joint sections while making reference to the table shown in (B) in FIG. 7 (a table b) for the image data contained in the joint sections (Steps s5 and s7). Then, a judgment is made as to whether or not the color separation process is completed for the entire image data (Step s9). If the judgment is negative, the process returns to Step s3 to repeat the same procedures for next image data. On the contrary, if the judgment is positive, the process is terminated after carrying out the above-described γ process as appropriate.

Then, quantization processing (halftoning processing) is performed on the multivalued image data obtained through the color separation processing as described above to generate two pieces of binary image data respectively corresponding to the joint sections and the non-joint sections. Thereafter, the image is printed on the printing medium by ejecting the ink from the inkjet heads on the basis of these pieces of binary image data.

Here, as for an index to uniform the gloss impression between the non-joint sections and the joint sections, it is possible to use the gloss value as shown in FIG. 5 or the haze value as shown in FIG. 6, both of which measured by the above-described micro-haze meter. In addition, it is also possible to employ a method using a clearness of an image reflected in a printed matter measured by an image clarity measuring device as the index or to use a measuring instrument such as a gonio-spectrometer capable of covering a wider measurement range by scanning with a photodetector.

Meanwhile, in the above-described embodiment, employed is a configuration in which the two density types of ink for an achromatic color (the black ink and the gray ink) are used as the first and second ink. However, it is also possible to use two density types of ink for chromatic colors such as cyan and magenta so that different color separation tables for each of the chromatic colors can be applied to the non-joint sections and the joint sections. In this case, dark cyan ink or dark magenta ink corresponds to the first ink while light cyan ink or light magenta ink corresponds to the second ink. Further, the number of density types of ink of each color is not limited to two but may be three or more. In this case, the lightest ink with the lowest density corresponds to the second ink while the second lightest ink with density higher than the lightest ink corresponds to the first ink. In addition, in order to reproduce an achromatic color, any density types of ink of any chromatic color may be added as appropriate. Alternatively, it is also possible to reproduce an achromatic color by mixing multiple chromatic color types of ink including inks with different densities. What is essential here is to use ink having the higher gloss level (the second ink) more in the joint sections than in non-joint sections in performing the image processing (the image data generation processing).

These features are also applicable to the embodiment to be described below.

Second Embodiment

The above embodiment has described the case of applying the present invention to the line printer configured to arrange the ejection openings and the head chips over the length corresponding to the width of the printing medium. However, the present invention is also effectively applicable to a serial-type inkjet printing apparatus configured to perform printing operations by repeating main scanning in a direction different from the direction of the ejection opening arrays and the relative conveyance (sub-scanning) of a printing medium in the orthogonal direction thereto. Because in the case of the serial-type inkjet printing apparatus image defects may be caused in a joint section between a printing region (a band) to be printed by a certain main scanning session and a printing region (a band) to be printed by the subsequent main scanning session after sub-scanning.

Figure 9:
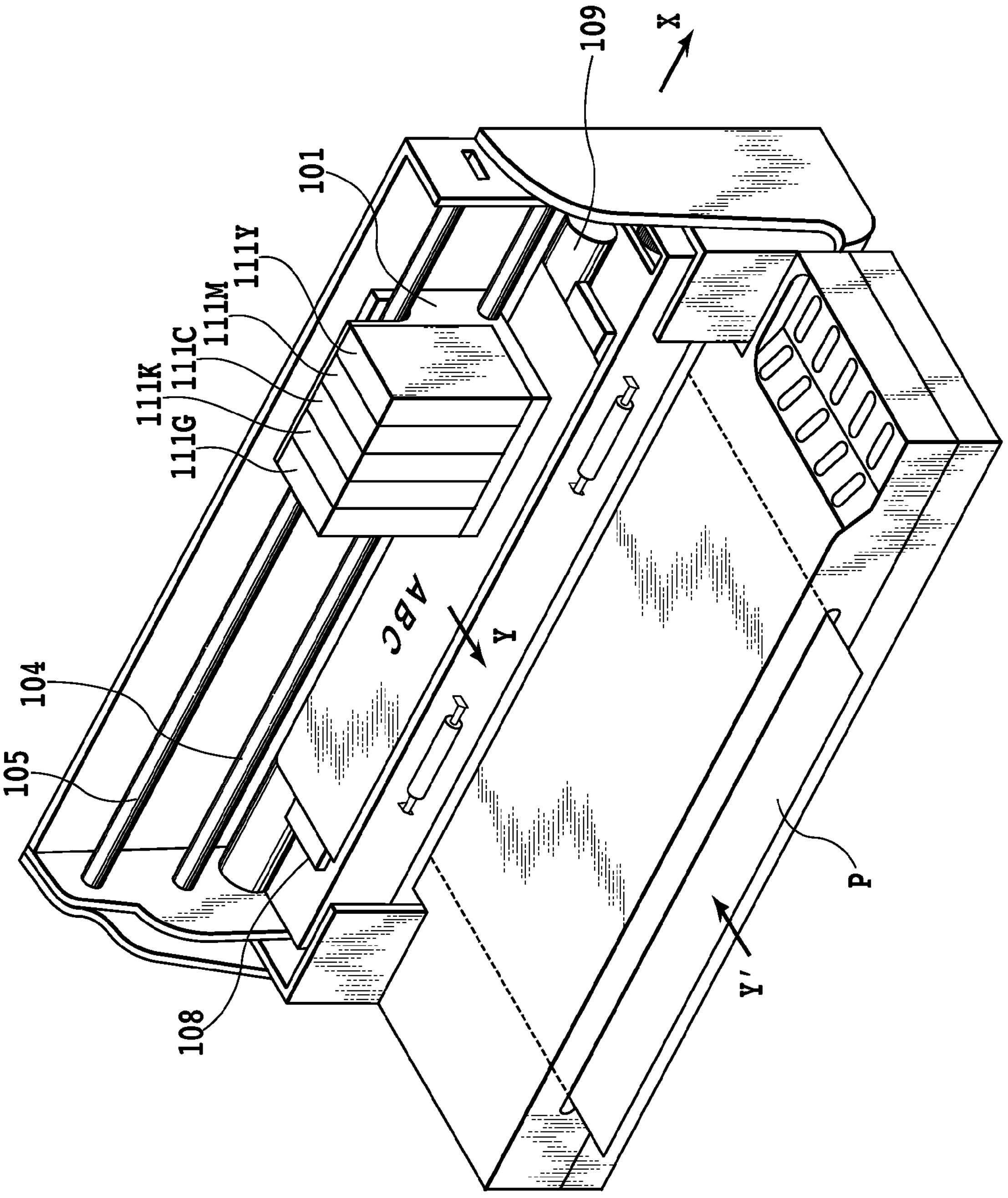
FIG. 9 is a schematic perspective view showing a configuration of the inkjet printing apparatus according to a second embodiment of the present invention.

FIG. 9 is a perspective view showing a schematic configuration of the serial-type inkjet printing apparatus that can employ the present invention. On a carriage 101, inkjet heads 111G, 111K, 111C, 111M, and 111Y as ejecting portions corresponding to color ink in gray, black, cyan, magenta, and yellow, respectively, are mounted. The carriage 101 is rendered reciprocable along guide shafts 104 and 105 extending in the main scanning direction X. Note that these inkjet heads will be collectively indicated by reference numeral 111 unless otherwise specified.

The printing medium P is fed from a front face side of the printing apparatus in a direction of an arrow Y' and the conveyance direction is reversed in the Y direction by a conveyor roller 109 so that a sub-scanning is performed with respect to a reciprocative scanning region by the inkjet heads 111. Meanwhile, in a region facing the inkjet heads 111, a surface to be printed is regulated flatly by a platen 108.

Each of the inkjet heads 111 includes an ejection opening array formed by arraying multiple ejection openings in a certain direction (such as the Y direction equivalent to the sub-scanning direction). Moreover, the inkjet heads 111 move in printable regions along with a main scanning operation of the carriage 101 as executing a required ink ejecting operation in accordance with image data, so as to complete printing on one band. After this main scanning operation, the next band is printed by conveying (sub-scanning) the printing medium P using the conveyor roller 109 and then performing a main scanning operation again.

The control system substantially similar to the system shown in FIG. 3 is also applicable to the inkjet printing apparatus having the above-described mechanical configuration. It is only necessary to add a mechanism necessary for main scanning of the inkjet heads.

Here, a white stripe attributable to uneven conveyance, end-deviation or the like may be caused when performing a sub-scanning corresponding to each of the ranges where the ejection openings are arrayed in the Y direction, i.e. a band width. Therefore, the printing operation is performed by setting the amount of sub-scanning below the band width so as to allow ends of mutually adjacent bands to overlap each other. Specifically, onto the joint sections, a group of ejection openings located on the lower end of the array of the ejection openings and a group of ejection openings located on an upper end of the array of the ejection openings are involved in printing. Moreover, the present invention aims at reduction of uneven gloss by applying standards similar to the above-described standards to the relation between these two groups of ejection openings and applying mutually different color separation tables to the joint sections and the non-joint sections.

Figure 10:
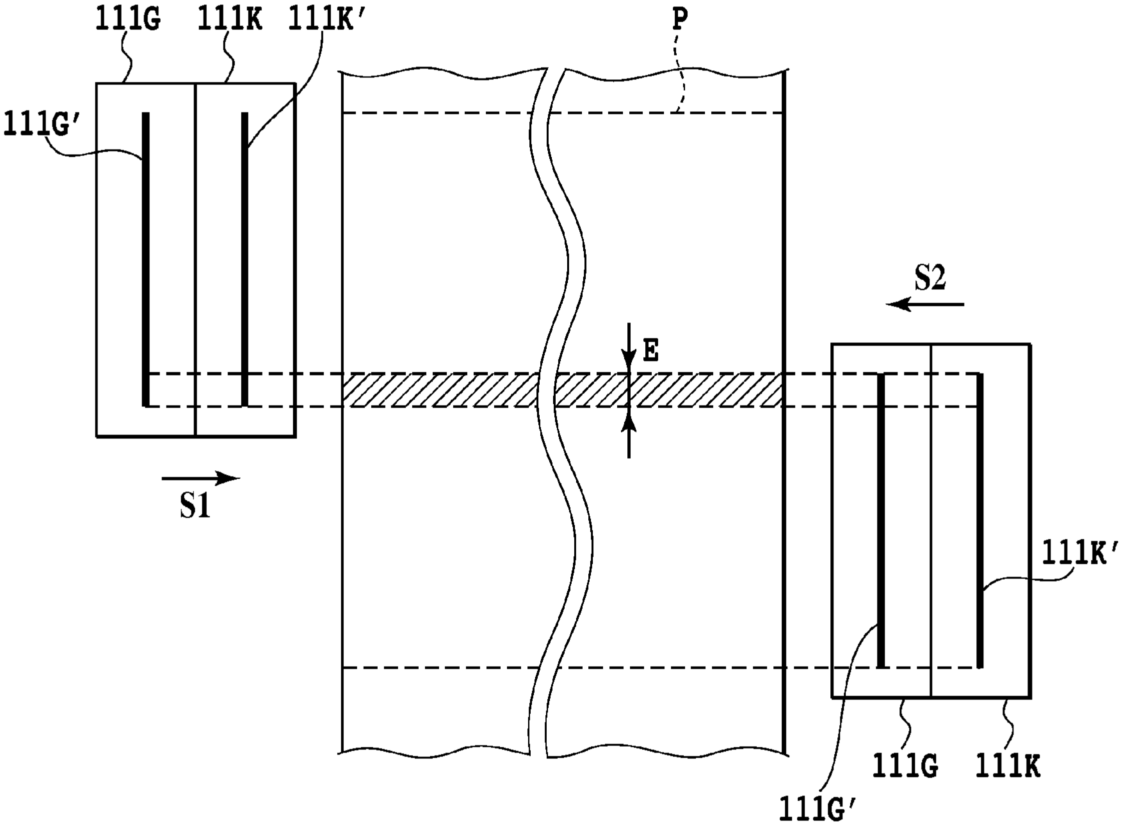
FIG. 10 is a conceptual diagram for explaining aspects of printing the joint section and the non-joint section in the second embodiment.

FIG. 10 is an explanatory view of that concept. Note that FIG. 10 illustrates the gray ink head 111G and the black ink head 111K for the purpose of simplification. Moreover, the number of the ejection openings is also simplified in the drawing.

As shown in the drawing, a band to be printed in a certain main scanning operation S1 and a band to be printed in the subsequent main scanning operation S2 overlap each other by setting an amount of conveyance during the main scanning operations shorter by the amount E than the length of the arrays of the ejection openings. Accordingly, the color separation process is performed for the image data corresponding to this joint section by applying the table shown in (B) in FIG. 7, while the color separation processing is performed for the image data corresponding to the non-joint sections other than the joint sections by applying the table shown in (A) in FIG. 7. In other words, the usage amounts of the gray ink and the black ink for reproducing a predetermined density (a density within the second and third density ranges) are adjusted such that the gray ink is used more in the joint sections than in the non-joint sections, and that the black ink is used less in the joint sections than in the non-joint sections. In this way, it is possible to uniform the gloss impressions between the non-joint sections and the joint sections and thereby to reduce uneven gloss.

Note that image printing is performed by means of main scanning in a forward direction and main scanning in a reverse direction, or bi-directional printing is performed in the example shown in FIG. 10. However, it is needless to say that the printing operation may only take place at the time of either main scanning in the forward direction or in the reverse direction.

Moreover, the above-described example is configured to perform one main scanning session at the non-joint sections where the bands do not overlap each other. However, it is needless to say that the preset invention is also applicable to a case of printing by means of multiple main scanning sessions (multipass printing). Since stripe-shaped unevenness may be caused by the uneven conveyance or the end-deviation even in multipass printing, a joining process may be performed from time to time by setting the amount of conveyance at less than a usual amount of conveyance for multipass printing (such as a half of the band width in the case of two-pass printing) in order to reduce such unevenness.

Figure 11:
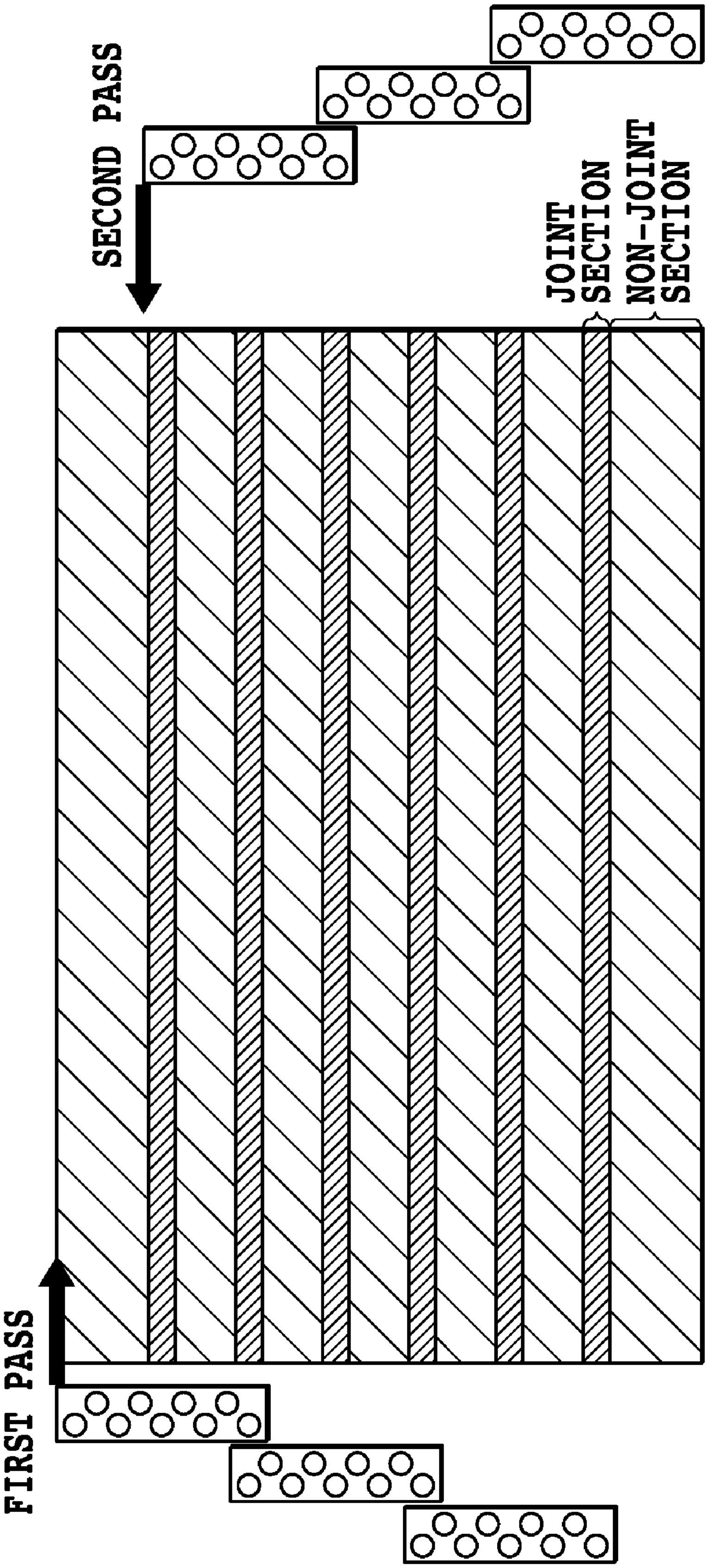
FIG. 11 is a view of a modified example of the second embodiment for explaining that the present invention is also applicable to multipass printing effectively.

This is because on a section where the joining process is applied printing is performed in the effective number of passes greater than the number of passes executed on a non-joint section in this case, as apparent from FIG. 11 for example. In the example shown in FIG. 11, the joint section is subjected to 3-pass printing while the non-joint section is subjected to 2-pass printing.

(Others)

In the above embodiments description has been made of the inkjet head employing a method of ejecting ink by thermal energy generated by elements (heaters). However, it is needless to say that the present invention is also applicable to inkjet heads employing other methods such as a method of ejecting ink by mechanical energy generated by piezoelectric elements.

Moreover, in the present invention the configuration to use the above-described colors of inks has been exemplified. However, it is needless to say that the present invention is not limited only to this configuration. The present invention is effectively applicable to any configurations provided that at least two types of ink having substantially identical or same color phase (similar colors) and having mutually different gloss levels are used therein.

In addition, in the present invention description has been made of the aspect configured to perform the characteristic image processing (image data generation processing) for the joint sections and the non-joint sections by use of the image processing unit 809 of the inkjet printing apparatus. However, the characteristic image processing may also be executed by an external device (such as a host computer) to be connected to the inkjet printing apparatus. In this case, the image data generated by the above-described characteristic image processing is transmitted from the external device to the inkjet printing apparatus. Thus, if the part capable of executing the characteristic image processing is incorporated in the inkjet printing apparatus, then the ink jet apparatus constitutes an image processing apparatus of the present invention. On the other hand, if the part capable of executing the characteristic image processing is incorporated in the external device, then the external device constitutes the image processing apparatus of the present invention.

Moreover, the present invention is also implemented by program codes for achieving the above-described characteristic image processing functions or by a storage medium storing the program codes. In this case, the above-described image processing is performed by causing a computer (or a CPU or a MPU) in a system or an apparatus to read and execute the program codes. As described, a program for causing the computer to execute the above-described characteristic image processing (the image data generation processing) and a storage medium storing the program are also included in the present invention.

As a storage medium for supplying the program codes, it is possible to use a floppy (registered trade mark) disk, a hard disk, an optical disk, a magneto-optical disk, a CD-ROM, a CD-R, a magnetic tape, a nonvolatile memory card, a ROM, and the like. Moreover, it is possible to cause an OS operated on a computer to execute a part or all of the actual processing in accordance with instructions of the program codes instead of implementing the functions of the above-described embodiment by causing a computer to read and execute the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-333201, filed Dec. 11, 2006, which is hereby incorporated by reference herein in their entirety.

What is claimed is:

1. An inkjet printing apparatus configured to perform printing by use of an inkjet head having first ejection-opening arrays each having ejection openings for ejecting first ink arranged in a predetermined direction and second ejection-opening arrays each having ejection openings for ejecting second ink arranged in the predetermined direction, the second ink having a similar color to the first ink and exhibiting a higher gloss level on a printing medium than that exhibited by the first ink on the printing medium, the first ejection-opening arrays being arranged so as to have an overlapping section in a direction crossing the predetermined direction and the second ejection-opening arrays being arranged so as to have an overlapping section in the crossing direction, the inkjet printing apparatus comprising:

a determination unit that determines amounts of the first ink and the second ink used to print on a joint section to be printed by the ejection openings included in the overlapping portions, and determines amounts of the first ink and the second ink used to print a non-joint section to be printed by the ejection openings excluded from the overlapping portions, wherein the determination unit determines usage amounts of the first ink and the second ink for the respective joint and non-joint sections such that the amount of the second ink used for expressing a predetermined density is more in a unit area of the joint section than in the unit area of the non-joint section, and the amount of the first ink used for expressing the predetermined density is less in the unit area of the joint section than in the unit area of the non-joint section.

2. An inkjet printing apparatus configured to perform printing by use of an inkjet head having a first ejection-opening array in which ejection openings for ejecting first ink are arranged in a predetermined direction and a second ejection-opening array in which ejection openings for ejecting second ink are arranged in the predetermined direction, the second ink having a similar color to the first ink and exhibiting a higher gloss level on a printing medium than that exhibited by the first ink on the printing medium, the inkjet printing apparatus comprising:

a moving unit that moves the inkjet head in a moving direction crossing the predetermined direction;

a conveying unit that conveys the printing medium in a conveying direction crossing to the moving direction so as to produce a joint section by overlapping ends of bands to be printed in the moving of the inkjet head; and a determination unit that determines amounts of the first ink and the second ink used to print on the joint section, and determines amounts of the first ink and the second ink used to print on a non-joint section other than the joint section, wherein the determination unit determines usage amounts of the first ink and the second ink for the respective joint and non-joint sections such that the amount of the second ink used for expressing a predetermined density is more in a unit area of the joint section than in the unit area of the non-joint section, and the amount of the first ink used for expressing the predetermined density is less in the unit area of the joint section than in the unit area of the non-joint section.

3. An inkjet printing apparatus as claimed in claim 1, wherein the first ink is black ink, and the second ink is gray ink being a similar color to the black ink and having a higher gloss level than the black ink.

4. An inkjet printing apparatus as claimed in claim 1, wherein the determination unit (a) determines usage amounts of the first ink and the second ink such that the first ink is not used while the second ink is used in both of the joint section and the non-joint section, when a first density range is expressed;

(b) determines usage amounts of the first ink and the second ink such that the first ink is not used while the second ink is used in the joint section and both of the first ink and the second ink are used in the non-joint section, when a second density range higher than the first density range is expressed; and (c) determines usage amounts of the first ink and the second ink such that both of the first ink and the second ink are used in both of the joint section and the non-joint section, when a third density range higher than the second density range is expressed, and wherein the predetermined density means a density within the second density range and a density within the third density range.

5. An image processing method of generating image data used for printing by use of an inkjet head having first ejection-opening arrays each having ejection openings for ejecting first ink arranged in a predetermined direction and second ejection-opening arrays each having ejection openings for ejecting second ink arranged in a predetermined direction, the second ink having a similar color to the first ink and exhibiting a higher gloss level on a printing medium than that exhibited by the first ink on the printing medium, the first ejection-opening arrays being arranged so as to have an overlapping section in a direction crossing the predetermined direction and the second ejection-opening arrays being arranged so as to have an overlapping section in the crossing direction, the image processing method comprising the step of:

generating image data for printing on a joint section to be printed by the ejection openings included in the overlapping portions, and image data for printing a non-joint section to be printed by the ejection openings excluded from the overlapping portions, wherein, in the generating step, image data for printing the respective joint and non-joint sections are generated such that the amount of the second ink used for expressing a predetermined density is more in a unit area of the joint section than in the unit area of the non-joint section, and the amount of the first ink used for expressing the predetermined density is less in the unit area of the joint section than in the unit area of the non-joint section.

6. An image processing method of generating image data used for printing by use of an inkjet head having a first ejection-opening array having ejection openings for ejecting first ink and a second ejection-opening array having ejection openings for ejecting second ink having a similar color to the first ink and exhibiting a higher gloss level on a printing medium than that exhibited by the first ink on the printing medium, the image processing method comprising the step of:

generating image data for printing a joint section at which ends of bands to be printed on the printing medium in moving of the inkjet head overlap each other, and image data for printing a non-joint section other than the joint section, wherein, in the generating step, image data for printing the respective joint and non-joint sections are generated such that the amount of the second ink used for expressing a predetermined density is more in a unit area of the joint section than in the unit area of the non-joint section, and the amount of the first ink used for expressing the predetermined density is less in the unit area of the joint section than in the unit area of the non-joint section.

7. An image processing apparatus for generating image data used for printing by use of an inkjet head having first ejection-opening arrays each having ejection openings for ejecting first ink arranged in a predetermined direction and second ejection-opening arrays each having ejection openings for ejecting second ink arranged in the predetermined direction, the second ink having a similar color to the first ink and exhibiting a higher gloss level on a printing medium than that exhibited by the first ink on the printing medium, the first ejection-opening arrays being arranged so as to have an overlapping section in a direction crossing the predetermined direction and the second ejection-opening arrays being arranged so as to have an overlapping section in the crossing direction, the image processing apparatus comprising:

a generating unit that generates image data for printing on a joint section to be printed by the ejection openings included in the overlapping portions and image data for printing a non-joint section to be printed by the ejection openings excluded from the overlapping portions, wherein the generating unit generates image data for printing the respective joint and non-joint sections such that the amount of the second ink used for expressing a predetermined density is more in a unit area of the joint section than in the unit area of the non-joint section, and the amount of the first ink used for expressing the predetermined density is less in the unit area of the joint section than in the unit area of the non-joint section.

* * * * *